United States Patent [19]

Breisinger et al.

[11] Patent Number: 4,537,284
[45] Date of Patent: Aug. 27, 1985

[54] LUBRICANT DISTRIBUTOR

[75] Inventors: Otto Breisinger, Meersburg; Herbert Burgbacher, Hilzingen, both of Fed. Rep. of Germany

[73] Assignee: Sulzer Brothers Limited, Winterthur, Switzerland

[21] Appl. No.: 386,229

[22] Filed: Jun. 8, 1982

[30] Foreign Application Priority Data

Jun. 19, 1981 [EP] European Pat. Off. ........ 81810252.7

[51] Int. Cl.³ ............................................. F16N 25/02
[52] U.S. Cl. ..................................... 184/7.4; 139/1 R; 184/29; 184/42; 222/330; 222/485; 417/495; 417/496; 417/502
[58] Field of Search ................ 184/6, 6.4, 6.17, 6.28, 184/7 R, 7 D, 7 E, 7 F, 26, 27 A, 27 C, 29, 55 R, 55 A, 56 R, 56 A, 7.2, 7.3, 7.4, 39.1, 42; 417/493, 494, 495, 496, 498, 502; 139/1 R, 45, 82; 222/49, 330, 478, 482, 484, 485, 486; 137/580, 624.14, 625.16

[56] References Cited

U.S. PATENT DOCUMENTS

| | | | |
|---|---|---|---|
| 667,947 | 2/1901 | Morrison | 222/485 |
| 1,128,643 | 2/1915 | Wetmore | 417/495 |
| 1,600,430 | 9/1926 | Schmidt | 184/7.2 X |
| 1,673,410 | 6/1928 | Larson | 184/7.2 X |
| 1,837,590 | 12/1931 | Sheppard | 184/7.2 X |
| 1,935,150 | 11/1933 | Fox et al. | 184/7 E |
| 2,115,637 | 4/1938 | Leonard | 184/7 E |
| 2,346,801 | 4/1944 | Venable | 184/7 E |
| 2,369,428 | 2/1945 | Berg | 184/7 F |
| 2,510,404 | 6/1950 | Lake et al. | 139/82 |
| 2,686,476 | 8/1954 | Klein et al. | 417/498 X |
| 2,694,977 | 11/1954 | Rotter | 184/7 E X |
| 2,783,713 | 3/1957 | Klein et al. | 417/495 |
| 2,793,593 | 5/1957 | Klein et al. | 417/495 X |
| 2,808,779 | 10/1957 | Mueller | 417/496 X |
| 2,834,433 | 5/1958 | Higgens | 184/7.4 |
| 2,856,023 | 10/1958 | Graves | 184/7.4 |
| 2,969,738 | 1/1961 | Ulbing | 417/502 X |
| 3,422,926 | 1/1969 | Stanaway | 184/7.4 |
| 3,526,299 | 9/1970 | Kiefer | 184/7 D |
| 3,888,284 | 6/1975 | Tiernan et al. | 139/82 |

FOREIGN PATENT DOCUMENTS

| | | | |
|---|---|---|---|
| 495148 | 8/1950 | Belgium. | |
| 2709584 | 9/1978 | Fed. Rep. of Germany. | |
| 906971 | 2/1946 | France. | |
| 1389991 | 1/1965 | France | 184/7 E |
| 1585677 | 1/1970 | France. | |
| 323193 | 8/1957 | Switzerland. | |
| 272963 | 3/1928 | United Kingdom | 184/7 D |
| 447010 | 5/1936 | United Kingdom. | |
| 152760 | 12/1963 | U.S.S.R. | |
| 821834 | 4/1981 | U.S.S.R. | |

Primary Examiner—David H. Brown
Assistant Examiner—John E. Griffiths
Attorney, Agent, or Firm—Kenyon & Kenyon

[57] ABSTRACT

The progressive distributor contains a control piston which is slidable in a cylinder. The piston contains a main channel and a plurality of radially disposed distribution channels for distributing lubricant. The cylinder has feed channels which are aligned with feed channels in a housing of a machine part to be lubricated and are arranged in offset relation to the distribution channels of the piston. The respective distribution channels and feed channels are arranged so that during movement of the piston in the cylinder, the various feed channels are progressively supplied with lubricant.

12 Claims, 12 Drawing Figures

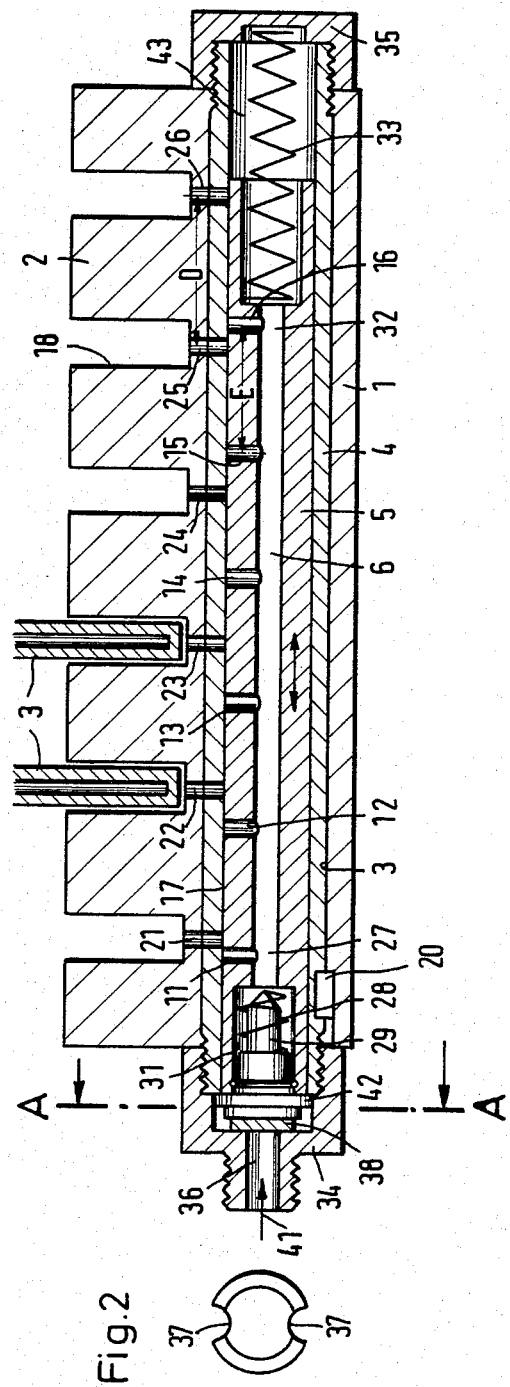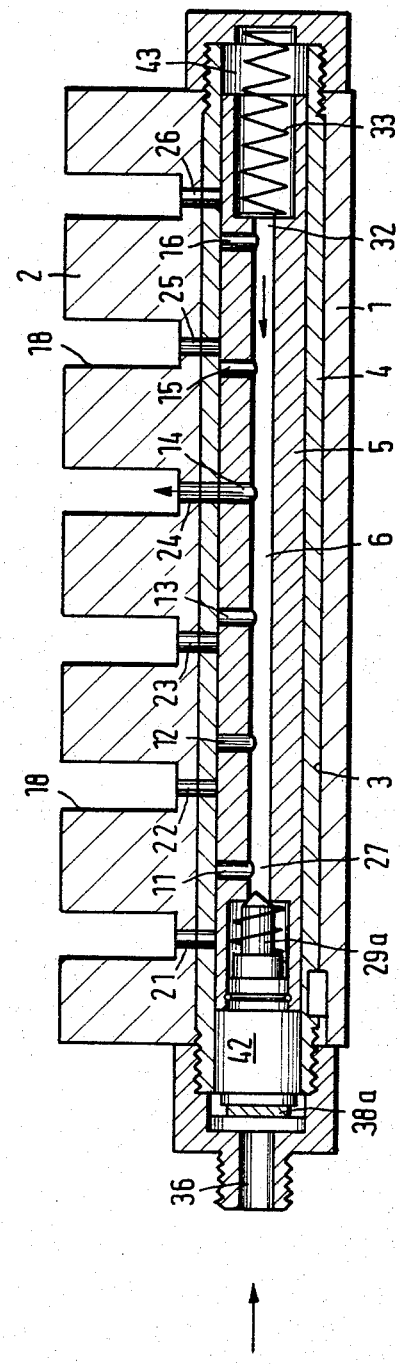

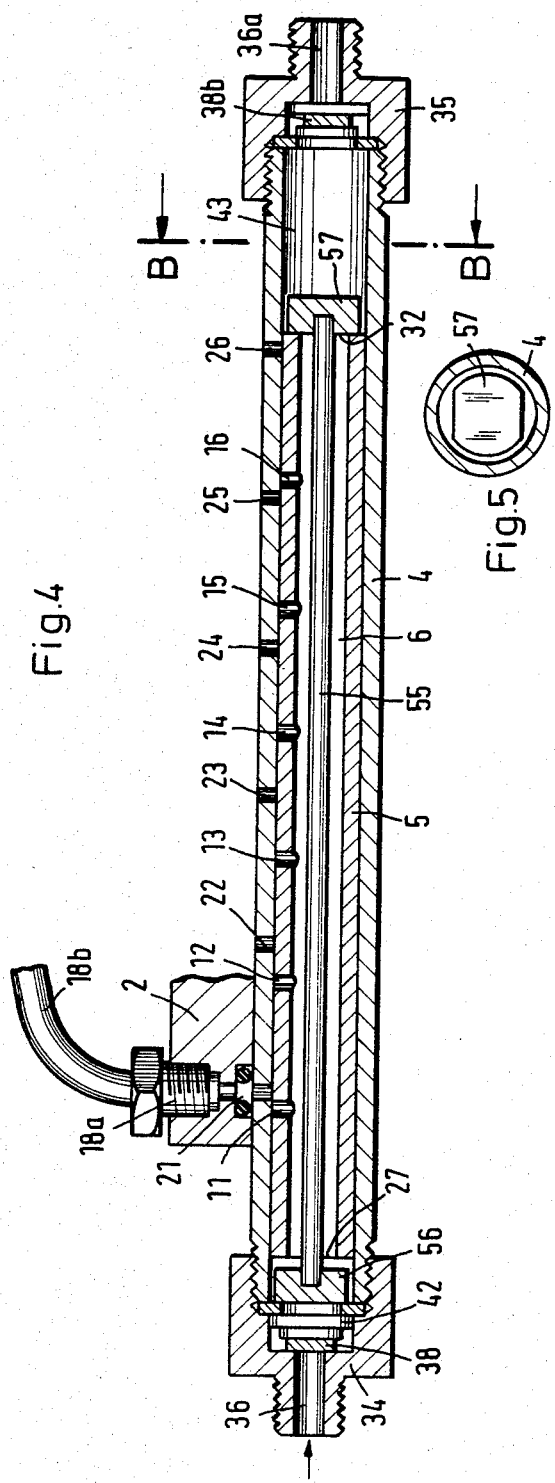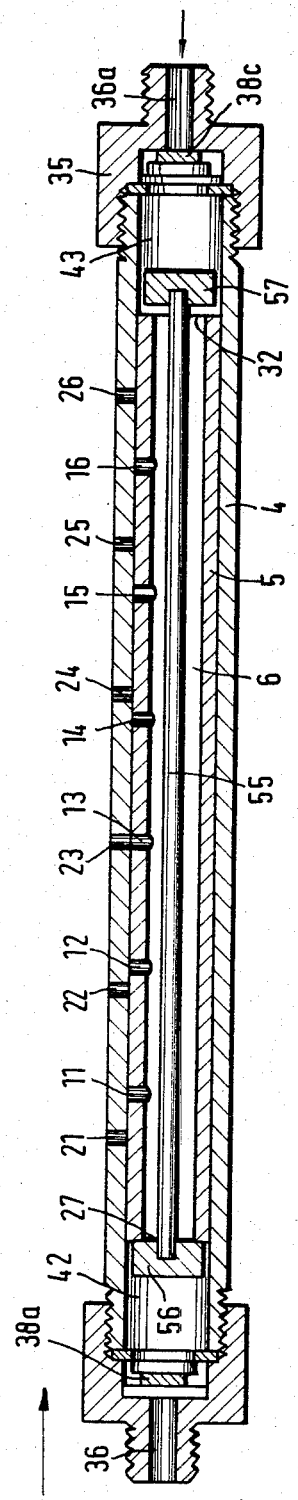

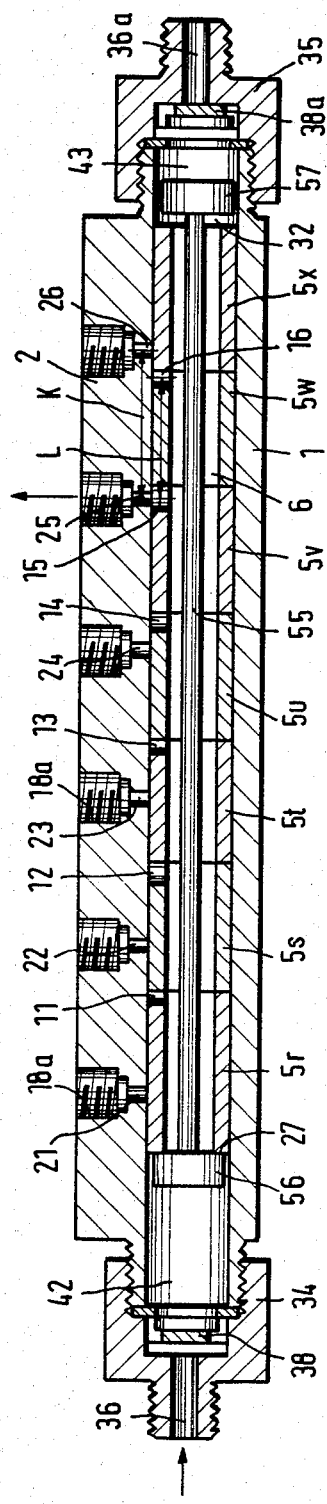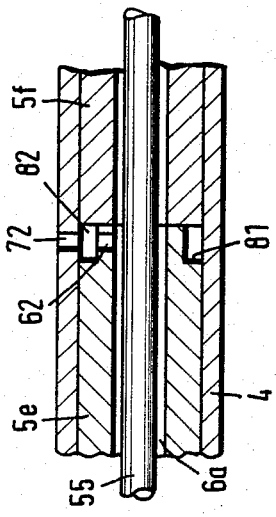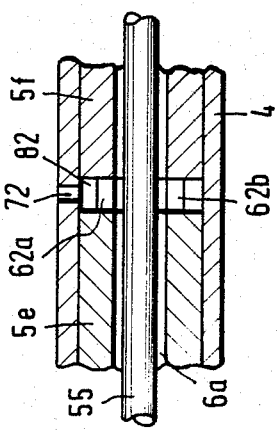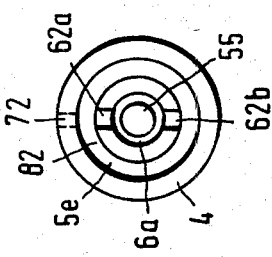

LUBRICANT DISTRIBUTOR

This invention relates to a lubricant distributor. More particularly, this invention relates to a lubricant distributor for a weaving machine.

Heretofore, various types of lubricant distributors have been known for distributing lubricant within a lubrication system. For example, one known lubrication system has employed a distributor having at least one control slide valve which is reciprocated within a housing so as to force lubricant from a lubricant reservoir at an end face of the valve to various lubrication points, for example in a weaving machine. It has also been known from German OS No. 27 09 584 to mount several, for example, three reciprocating control pistons in a cylinder of a common housing. In this case, each control piston is inserted with lubricant at the end face and is displaced such that peripheral annular grooves in the piston can be brought into a position in which communication occurs with two adjacent lubricant channels. By a progressive insertion of the individual control pistons, the lubricant can be distributed progressively over respective lubrication lines and the lubrication points.

However, these known progressive distributors must be provided at the points of the machine to be lubricated and must be connected with the individual lubrication points through hoses or pipes. This results in an extensive line or hose system, particularly, when there are many lubrication points and, thus, may be intricate and trouble-prone.

Accordingly, it is an object of the invention to provide a lubricant distributor which is of relatively simple construction.

It is another object of the invention to provide a lubricant distributor which requires a minimum of space.

It is another object of the invention to be able to directly lubricate a large number of lubrication points in an efficient manner.

Briefly, the invention provides a lubricant distributor which is comprised of a housing and at least one control slide valve which is movably mounted in the housing.

The housing is constructed with a plurality of feed channels which are disposed in axially offset relation to each other at a given spacing. The valve is constructed with a main channel for receiving lubricant and a plurality of distribution channels in communication with the main channel in order to receive lubricant therefrom. In addition, the distribution channels are axially offset to each other at a spacing different from the spacing of the feed channels. These distribution channels are also aligned with the feed channels so that upon movement of the control valve in the housing, each distribution channel is progressively aligned with a respective feed channel.

Thus, it is possible to lodge the distributor directly in a guideway, for example in a heddle of a guideway of a weaving machine having a relatively large number of lubrication points. As a result, feed hoses can be eliminated.

One particular advantage of the distributor is that the lubricant can be conveyed to the individual lubrication points directly through channels present in the housing. Also, it is possible to accommodate an especially large number of lubricant point connections which are to be supplied progressively in a compact space-saving manner.

In one embodiment, the control valve includes a cylinder and a piston which is slidably mounted in the cylinder. In this case, the main channel is disposed within the piston in axially parallel relation while the distribution channels are disposed in radial relation. It then becomes possible to position the cylinder and control piston in an appropriate bore in the housing direclty in the vicinity of the lubrication points. Mass produced parts which are easy to manufacture can be used to construct the distributor.

These and other objects and advantages of the invention will become more apparent from the following detailed description taken in conjunction with the accompanying drawings wherein:

FIG. 1 illustrates a longitudinal sectional view through a lubricant distributor constructed in accordance with the invention;

FIG. 2 illustrates a view taken on line A—A of FIG. 1;

FIG. 3 illustrates a longitudinal sectional view of another position of the parts of the distributor of FIG. 1;

FIG. 4 illustrates a modified lubricant distributor according to the invention;

FIG. 5 illustrates a view taken on line B—B of FIG. 4;

FIG. 6 illustrates the distributor of FIG. 4 in another position;

FIG. 9 illustrates a further embodiment of a distributor according to the invention;

FIG. 10 illustrates an enlarged detail view of a modified distribution channel in accordance with the invention;

FIG. 11 illustrates an enlarged detail view of a further modified distribution channel in accordance with the invention; and FIG. 12 illustrates an end view of the structure of FIG. 11.

Figure 7:
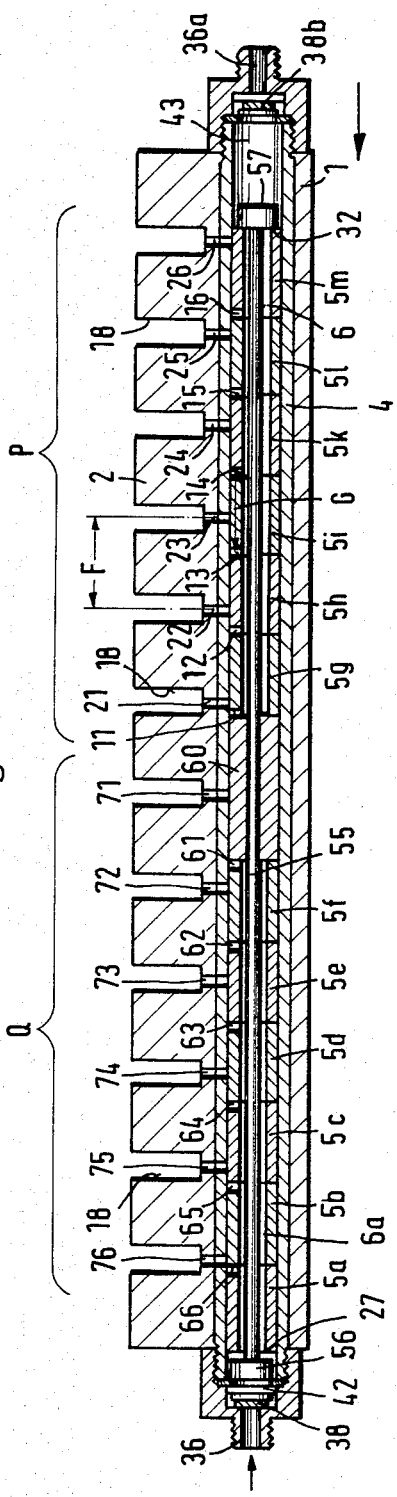
FIG. 7 illustrates a view of a modified distributor having individual piston segments in accordance with the invention.

Referring to FIG. 1, the liquid distributor includes a housing 1 which forms part of a frame of a weaving machine (not shown) in which a guideway 2 for heddles 3 is formed. These heddles 3 are movable back and forth perpendicular to the plane of the drawing, as viewed, and serve to form a shed of warp threads in known manner. In addition, the housing 1 is provided with a cylindrical bore 3 along a longitudinal axis near the guideway 2 in order to receive a control slide valve of a central lubrication system.

The control slide valve has a control cylinder 4 and a control piston 5 which is movably mounted, i.e. reciprocally mounted within the control cylinder 4 so as to move relative to the housing 1. The cylinder 4 includes a plurality of radially disposed feed channels as shown. The piston 5 contains a main channel 6 which is disposed therein in axially parallel relation as well as a plurality of radially disposed distribution channels 11–16. As indicated, the distribution channels 11–16 branch off from the main channel 6 and lead to the outer circumferential surface 17 of the piston 5. These distribution channels 11–16 are axially spaced from each other at a constant spacing E longitudinal of the housing axis.

The guideway 2 is provided with a plurality of guide grooves 18 for the heddles 3 as well as with a plurality of feed channels 21-26 which are radially aligned with the channels in the cylinder 4. These feed channels 21-26 are disposed in axially offset relation to each other at a constant spacing D. As can be seen from FIGS. 1 and 3, the graduation (distance) D of the feed channels 21-26 is the same as the spacing between the channels in the cylinder 4 and greater than the graduation (distance) E of the distributing channels 11-16.

As shown in FIG. 1, a lubricant feeding valve 29 which is under the action of a spring 28 is disposed at one end of the main channel 6 within a bore 31 of the piston 5 for supplying lubricant to the main channel 6. A return spring 33 is disposed at the opposite end 32 of the channel 6 in order to bias the piston 5 towards the valve 29. A lubricant reservoir 43 is also disposed at this end of the piston 5 in communication with the main channel 6.

The cylinder 4 is secured in the housing 1 by means of closure pieces 34, 35 and is held against rotation by a wedge 20 which is inserted between the cylinder 4 and housing 1. A single lubricant feed line (single conductor system) can be connected to a feed line or duct 36 in one closure piece 34 so as to feed lubricant into the distributor. As indicated, a check valve 38 is provided with a pair of recesses 37 (FIG. 2) in the closure piece 34 so as to block a flow of lubricant from the duct 36 to the valve 29. As indicated, the cylinder 4 and piston 5 form a structural unit.

During operation, a lubricant such as grease is forced under a certain operating pressure, for example 50 bar, into the duct 36 as indicated by the arrow 41 in FIG. 1. Under this pressure, the check valve 38 moves into an open position 38a (FIG. 3) so that grease can pass through the recesses 37 in the check valve into a space 42 between the check valve 38 and valve 29. Because of the pressure in the space 42, the feed valve 29 is moved against the bias of the compression spring 28 into a closing position 29a, for example as shown in FIG. 3, in which the main channel 6 is closed at the end 27. Continued supply of the grease into the space 42 causes the piston 5 to move against the bias of the compression spring 33, i.e. to the right as viewed in FIG. 1.

As the piston 5 moves to the right, as viewed in FIG. 1, the initial distribution channel 11 moves into alignment with the initial feed channel 21 in the housing 2. As the piston 5 continues to move to the right, the successive distribution channels 12-16 come into successive alignment with the feed channels 22-26. For example, as shown in FIG. 3, the distribution channel 14 is in alignment with the feed channel 24 at an intermediate point of travel of the piston 5 to the right.

During the movement of the control piston 5 to the right, as viewed, the spring 33 is compressed so that grease which is present in the reservoir 43 is conveyed through the main channel 6 and into and through the aligned distribution channel and feed channel. In this manner, grease is sequentially fed into the guide grooves 18 for the heddles 3 in a progressive manner.

After a lubrication operation is completed, the pressure in the duct 36 is removed. The valve 29 then springs open under the action of the spring 28 into the position as indicated in FIG. 1. Thereafter, the control piston 5 is moved to the left, as viewed, under the action of the spring 33 and the check valve 38 is closed. The grease contained in the space 42 is then displaced to the right through the main channel 6 so that the reservoir 43 again fills.

Of note, the valve 29 is suitably constructed and positioned within the bore 31 of the piston 5 so as to permit a flow of grease from the space 42 into the main channel 6 when the valve 29 is an opened condition.

Because of the increased friction in the relatively narrow channels 11-16; 21-26 as well as the resistance in the heddle guide grooves 18, grease is prevented from moving into the guide grooves 18 during movement of the control piston 5 to the left.

Referring to FIGS. 4 to 6, wherein like reference characters indicate like parts as above, the lubricant distributor may be constructed as a two conductor system. In this respect, a lubricant feed line is connected at each end of the piston 5 for feeding lubricant into the cylinder 4 in alternating manner in order to reciprocate the piston 5 within the cylinder 4. In addition, the piston 5 includes a valve stem 55 which passes longitudinally through the main channel 6 and a pair of valve disks 56, 57 which are mounted at the ends of the valve stem 55. As indicated in FIG. 4, each of the valve disks 56, 57 is sized so as to close off the main channel 6 at one end. Further, the valve stem 55 is sized so that only one valve disk 56, 57 at a time is able to close off the main channel 6.

Wheh pressure is applied to a feed line 36 for lubrication, the check valve 38 is moved into an opened position 38a as indicated in FIG. 6. The valve stem 55 and accompanying disks 56, 57 are then shifted to the right, as viewed, so that the main channel 6 is closed at the end 27 and opened at the opposite end 32. Grease then fills the chamber 42 and as the pressure increases, the piston 5 begins to move to the right along with the valve stem 55. During this time, the check valve 38b is closed so that the grease within the reservoir 43 is displaced into the main channel 6 and, thence, out through the distribution channel and feed channel which are aligned. For example, as shown in FIG. 6, grease is exhausted through the distribution channel 13 and a feed channel 23 in the cylinder 4.

As shown in FIG. 4, each of the feed channels 21-26 in the housing 1 may be connected via suitable couplings 18a to a hose 18b in order to dispense lubricant to remote lubrication points.

For the next scheduled lubrication, pressure is applied to the grease feed line 36a connected to the closure piece 35 while pressure is relieved in the feed line 36. Thus, the valve 38b is moved to an opened position as indicated in FIG. 6 and the valve stem 55 is moved to the left, as viewed. Thereafter, the valve disk 57 closes off the main channel 6 and the piston 5 begins to move to the left. At this time, the check valve 38 is closed and the main channel 6 is opened at the end 27. During this movement, the distribution channel 16 first comes into alignment with the feed channel 26. Thus, the sequence of lubricant distribution is reversed from that described above.

Figure 8:
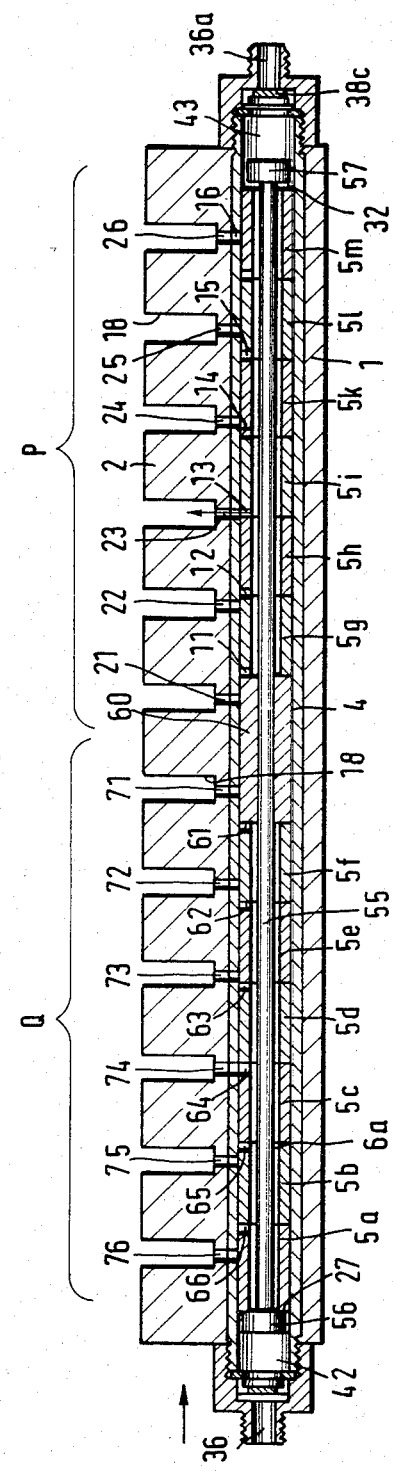
FIG. 8 illustrates a cross-sectional view of the distributor of FIG. 7 in a displaced position.

Referring to FIGS. 7 and 8, wherein like reference characters indicate like parts as above, the control piston may be comprised of a plurality of individual coaxially arranged sections 5a-5m which are sub-divided into groups by at least one separation piece 60. As shown in FIG. 7, the separation piece 60 is carried at the center of the valve stem 55 and is able to slide within the cylinder 4 in sealed relation.

When pressure is applied through the feed line 36, the check valve 38, valve stem 55, disks 56, 57 and check valve 38b all move to the right, as viewed. Thereafter, as the pressure in the space 42 increases, the piston 5a-5m is moved to the right. Thus, the distribution channels 11-16 move into progressive alignment with the feed channels 21-26 so that grease can be dispensed from the reservoir 43 in a fashion similar to that described above.

According to the lubrication schedule, pressure can be applied to the feed line 36a while pressure is relieved from the feed line 36 so as to cause the piston 5a-5m to move to the left, as viewed. At this time, the valve disk 57 has closed off the main channel 6 while the valve disk 56 has opened the main channel 6a. Thus, the distribution channels 66-61 come into progressive alignment with the feed channels 71-76. Grease is then dispensed from the reservoir 42 into these aligned channels in a progressive manner.

The separation piece 60 thus serves to not only separate the distribution and feed channels into separate groups P,Q but also divides the main channel of the piston into two sections.

As indicated in FIG. 7, the spacing F between the feed channels is constant and is greater than the spacing G between the distribution channels.

With the piston 5a-5m moving to the right, the six heddle guide grooves 18 lying in the section P are lubricated and during the following movement to the left, the six heddle guide grooves 18 lying in the section Q are lubricated. Thus, a total of twelve feed channels 21-26, 71-76 are available for twelve heddles or twice as many as illustrated in FIGS. 1 to 6. Further, during a complete reciprocation cycle of the piston 5a-5m, all the lubrication points receive grease once.

Referring to FIG. 9, wherein like reference characters indicate like parts as above, the piston may be composed of coaxial sections 5r-5x each of which are of different lengths. For example, section 5r is longer than section 5s or section 5u. Also, the distribution channels 11-16 are of different dimensions. For example, the distribution channel 15 has a particularly large cross-section while distribution channels 11 and 13 have a much smaller cross-section. The spacing L between the distribution channels 11-16 is also different. However, the spacing K between the feed channels 21-26 is constant. In any case, the distance between two adjacent feed channels 21-26 is greater than the distance between two associated adjacent distribution channels 11-16. Thus, the quantity of lubricant which can be fed into the individual lines 18 connected with the feed channels 21-26 is different. This may be of advantage in particular cases.

As indicated in FIG. 9, the control piston 5r-5x is in a right hand stroke with pressure being applied to the feed line 36. At this time, the main channel 6 is closed at the end 27 and open at the opposite end 32. In the position indicated, the distribution channel 15 and feed channel 25 are aligned.

Referring to FIG. 10, a piston segment 5e may be provided with an annular shoulder 81 at one end in order to form an annular groove 82 with the adjacent segment 5f so as to open into a distribution channel 62. As indicated, the distribution channel 62 is of a shorter length due to the presence of the annular groove 82. Thus, the distribution channel 62 need not be aligned in the radial direction with the associated feed channel 72. Instead, it suffices if the annular groove 82 is opposite the feed channel 72. Thus, the distribution channel 62 may be in any position in which a radial plane passes through the channels 62, 72.

Referring to FIGS. 11 and 12, the piston segment 5e may be provided with two mutually opposite slots 62a, 62b which open into the annular groove 82 to fulfill the same function as the shortened distribution channel of FIG. 10. Of note, several progressive distributors may be connected in parallel, for example, for lubricating entirely different mechanisms of a weaving machine or other machine. Further, the control piston used in each may have an entirely different length and may comprise a different number of distribution channels.

The lubricant which is used may also be a liquid or vapor. Finally, the spacing D between the feed channels may be smaller than the spacing E between the distribution channels so as to give a different sequence of alignment between the distribution channels 11-16 and the feed channels 21-26.

We claim:
1. A lubricant distributor comprising
   a housing having a longitudinal axis and a plurality of feed channels disposed longitudinally along said axis and in axially spaced part relation to each other at a given spacing; and
   a piston movably mounted within said housing, said piston including an axially disposed main channel for receiving lubricant and a plurality of radially disposed distribution channels in communication with said main channel to receive lubricant therefrom, said distribution channels being disposed longitudinally along said axis in axially spaced apart relation to each other at a spacing different from said given spacing and aligned with said feed channels whereby upon movement of said piston in said housing, each said distribution channel is progressively aligned with a respective one of said feed channels.

2. A lubricant distributor as set forth in claim 1 further comprising a lubricant feed line at at least one end of said cylinder for feeding lubricant to said main channel, a check valve for selectively closing said feed line, a feed valve for selectively closing said main channel to said feed line, a first reservoir space for lubricant between said check valve and said feed valve, and a second reservoir space for lubricant at an opposite end of said cylinder in communication with said main channel.

3. A lubricant distributor comprising
   a housing having a longitudinal axis and a plurality of feed channels disposed longitudinally along said axis and in axially spaced apart relation to each other at a given spacing; and
   at least one control slide valve mounted in said housing, said valve including a cylinder and a piston slidably mounted in said cylinder, said piston having a main channel disposed therein in axially parallel relation for receiving lubricant and a plurality of distribution channels in communication with said main channel to receive lubricant therefrom, said distribution channels being disposed longitudinally along said axis in axially spaced apart relation to each other at a spacing different from said given spacing and aligned with said feed channels whereby upon movement of said piston in said housing, each distribution channel is progressively aligned with a respective one of said feed channels.

4. A lubricant distributor as set forth in claim 3 wherein said distribution channels are disposed in radial relation.

5. A lubricant distributor as set forth in claim 4 which further comprises a lubricant feeding valve at one end of said main channel for supplying lubricant thereto, a lubricant reservoir at the opposite end of said main channel and a return spring at said opposite end for biasing said piston in a direction towards said one end.

6. A lubricant distributor as set forth in claim 4 which further includes an annular groove in said piston about at least one of said distribution channels for alignment with a respective one of said feed channels.

7. A lubricant distributor as set forth in claim 4 wherein said piston and cylinder form a structural unit disposed in a bore of said housing and said housing has a plurality of lubrication points in communication with said feed channels.

8. A lubricant distributor as set forth in claim 4 which further comprises a lubricant feed line at each end of said piston for feeding lubricant into said cylinder in alternating manner to reciprocate said piston within said cylinder.

9. A lubricant distributor as set forth in claim 8 wherein said piston further includes a valve stem passing longitudinally through said main channel and a pair of valve disks mounted on said stem, each said disk being disposed at a respective end of said stem to selectively close off said main channel at one end thereof.

10. A lubricant distributor as set forth in claim 4 wherein said control piston is comprised of a plurality of individual coaxially arranged sections.

11. A lubricant distributor as set forth in claim 10 wherein said control piston further comprises at least one separation piece dividing said sections into groups and movable with said sections.

12. A lubricant distributor as set forth in claim 10 wherein said sections are of different lengths.

* * * * *